United States Patent
Loudon et al.

(10) Patent No.: US 9,879,189 B2
(45) Date of Patent: Jan. 30, 2018

(54) TREATMENT OF WAX

(71) Applicant: Sasol Technology (Proprietary) Limited, Rosebank (ZA)

(72) Inventors: Dylan S. Loudon, Vanderbijlpark (ZA); Daniel S. Bezuidenhout, Centurion (ZA); Gernot Meyer, Rosengarten (DE); Ingo Behrmann, Hamburg (DE); Hans-Jorg Scheidat, Norderstedt (DE); Heiko Feitkenhauer, Hamburg (DE)

(73) Assignee: Sasol Technology (Proprietary) Limited, Rosebank (ZA)

( * ) Notice: Subject to any disclaimer, the term of this patent is extended or adjusted under 35 U.S.C. 154(b) by 0 days.

(21) Appl. No.: 14/419,034

(22) PCT Filed: Jul. 30, 2013

(86) PCT No.: PCT/IB2013/056249
§ 371 (c)(1),
(2) Date: Feb. 2, 2015

(87) PCT Pub. No.: WO2014/020535
PCT Pub. Date: Feb. 6, 2014

(65) Prior Publication Data
US 2015/0166909 A1    Jun. 18, 2015

Related U.S. Application Data

(60) Provisional application No. 61/678,664, filed on Aug. 2, 2012.

(51) Int. Cl.
*C10G 73/44* (2006.01)
*B01D 9/00* (2006.01)
(Continued)

(52) U.S. Cl.
CPC .......... *C10G 73/44* (2013.01); *B01D 9/0013* (2013.01); *B01D 9/0027* (2013.01);
(Continued)

(58) Field of Classification Search
CPC .. B01D 9/0013; B01D 9/0027; B01D 9/0031; C10G 73/44; C10G 73/02; C10G 2/332; C10G 45/00; C10G 2300/1022
See application file for complete search history.

(56) References Cited

U.S. PATENT DOCUMENTS 2,915,450 A    12/1959   Olson
3,232,682 A *   2/1966   White .................. F16C 33/201
                                                        384/206
(Continued)

FOREIGN PATENT DOCUMENTS

| EP | 0323092 A2 | 7/1989 |
| EP | 0668342 A1 | 8/1995 |
| WO | WO-2002/102941 A2 | 12/2002 |

OTHER PUBLICATIONS

Wolfmeier, U. et al., "Waxes", *Ullmann's Encyclopedia of Industrial Chemistry*, 111-172 (Wiley-VCH Verlag GmbH & Co. KGaA, Weinheim, Germany, Jun. 15, 2000).
(Continued)

*Primary Examiner* — Prem C Singh
*Assistant Examiner* — Brandi M Doyle
(74) *Attorney, Agent, or Firm* — Dana M. Gordon; Foley Hoag LLP

(57) ABSTRACT

A method of treating or refining a wax includes hydrogenating a feed wax which has an MEK-solubility oils content of more 0.5 weight % to provide a hydrogenated wax. Thereafter the hydrogenated wax is de-oiled to reduce the MEK-solubility oils content of the hydrogenated wax, producing a refined wax or a wax product.

8 Claims, 1 Drawing Sheet

(51) Int. Cl.
*C10G 45/00* (2006.01)
*C10G 73/02* (2006.01)
*C10G 2/00* (2006.01)

(52) U.S. Cl.
CPC .......... *B01D 9/0031* (2013.01); *C10G 2/332* (2013.01); *C10G 45/00* (2013.01); *C10G 73/02* (2013.01); *C10G 2300/1022* (2013.01)

(56) References Cited

U.S. PATENT DOCUMENTS 5,904,834 A * 5/1999 Ansorge ................ C10G 65/04
106/270
6,074,548 A 6/2000 Matzat et al.

OTHER PUBLICATIONS

International Preliminary Report on Patentability from corresponding application PCT/IB2013/056249 dated Sep. 18, 2014.
International Search Report from corresponding application PCT/IB2013/056249 dated Feb. 14, 2014.

* cited by examiner

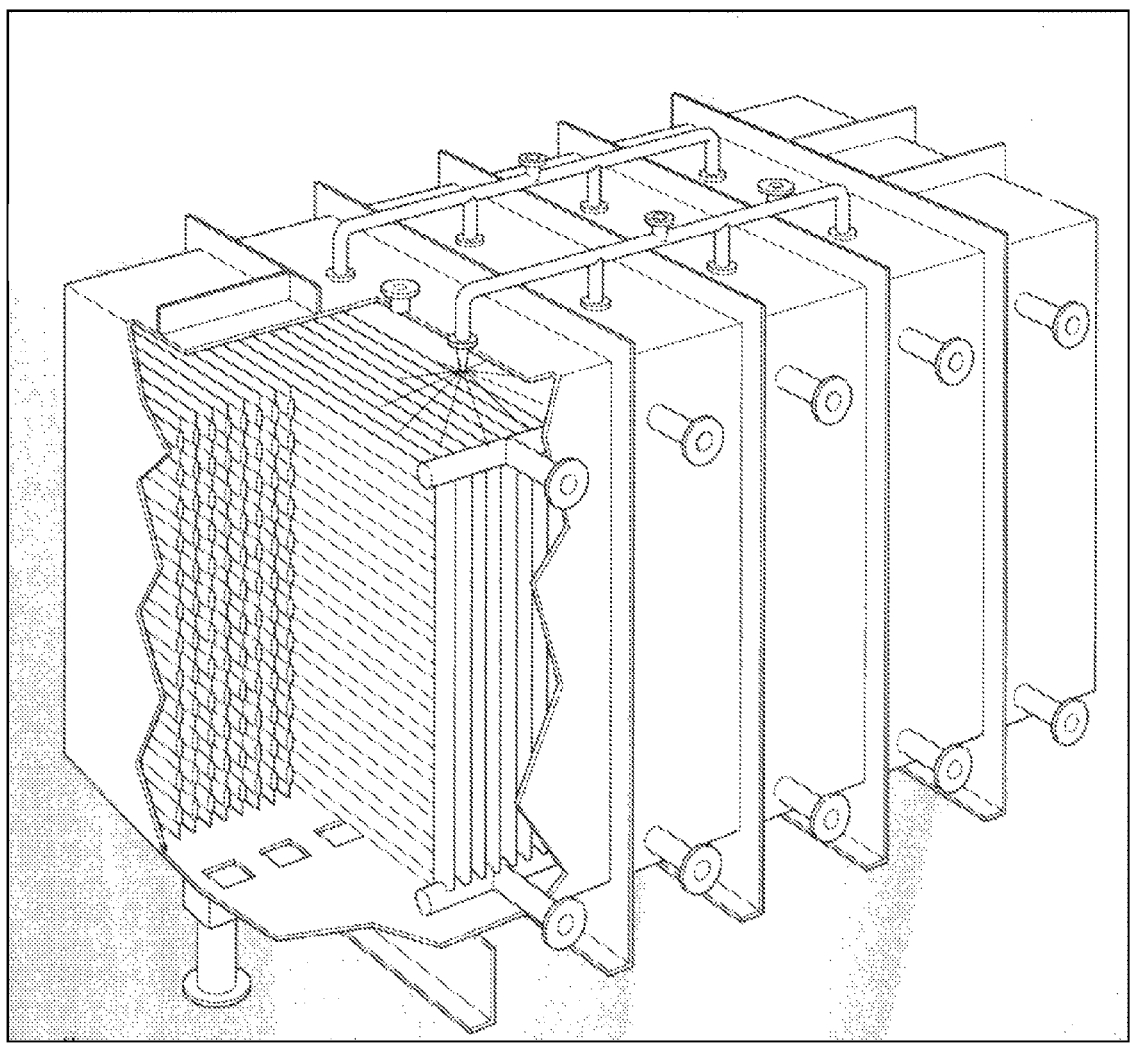

TREATMENT OF WAX

RELATED APPLICATIONS

This application is the U.S. national phase of International Patent Application No. PCT/IB2013/056249, filed Jul. 30, 2013; which claims the benefit of U.S. Provisional Application No. 61/978,664, filed Aug. 2, 2012.

THIS INVENTION relates to treatment of wax. In particular, the invention relates to a method of treating a wax, and to a wax product produced by the method.

Industrial waxes, in particular paraffinic waxes, are used in various applications such as candles, food coatings, adhesives, hydrophobing agents for wood, rubbers, etc. Raw wax is produced from starting materials which may be of petrochemical origin such as those produced by the well-known Fischer-Tropsch hydrocarbon synthesis process and those derived as by-product from crude-oil refineries by de-waxing of a lubrication oil fraction (known in the art as slack wax). These raw waxes are mostly long-chain paraffins for slack waxes up to <SN300 and may include a broad range of chain lengths of hydrocarbons ranging from about 20 carbon atoms to about 70 carbon atoms. Such raw waxes are normally distilled into narrower fractions providing wax products better matching specific requirements of particular final applications.

One of the important requirements to render a wax suitable for use in many applications is that it should not have more than 0.5 weight % of oil components therein. The oils content of such refined or fully refined waxes is measured by performing an analytic extraction of the oils with MEK (methyl ethyl ketone, also known as butanone) as solvent (using the ASTM D721 Standard Test Method of Oil Content of Petroleum Waxes) and all components extracted by the MEK solvent are defined as oil components. Slack wax and Fischer-Tropsch derived wax have been refined or de-oiled in the past using different techniques being primarily solvent de-oiling, sweating and fractional crystallisation.

In addition to oil content, another important requirement of a refined or fully refined wax is that it should not have an offensive colour. In this respect a white colour is often required. It is known that certain oxygenated components such as certain long chain aldehydes and ketones impart undesirable colour properties to the wax and that these components should be removed, for example by hydrogenation to the corresponding paraffins. The conventional approach in the art is that the sequence of processing the wax should be to first conduct a de-oiling step of raw wax fractions, followed by hydrogenation thereof as a final step. The reason for this particular sequence is to first remove MEK-soluble components which are soft by deoiling and subsequently convert unsaturated and heteroalkanic hydrocarbons that lead to colour deterioration by hydrogenation. Since the colour specification is the more difficult requirement to achieve, the hydrogenation step was traditionally seen as a "polishing step" which had to be done last to ensure the best achievable colour stability.

Some waxes, e.g. paraffinic wax derived from a Fischer-Tropsch hydrocarbon synthesis process, are difficult to de-oil to low oil contents and a method of treating such waxes effectively and efficiently to achieve desirable wax properties would thus be advantageous.

According to the invention there is provided a method of treating or refining a wax, the method including hydrogenating a feed wax which has an MEK-solubility oils content of more than 0.5 weight % to provide a hydrogenated wax; and thereafter de-oiling the hydrogenated wax thereby to reduce the MEK-solubility oils content of the hydrogenated wax, producing a refined wax or a wax product.

The MEK-solubility oils content of the feed wax may be less than 5 weight %.

Although an embodiment wherein the de-oiling step takes place directly after the hydrogenation step (typically with only one or more connecting conduits establishing flow communication between apparatus in which the hydrogenation step is effected and apparatus in which the de-oiling step is effected) is included within the ambit of this invention, the invention is not limited thereto. For example, the invention includes those embodiments where intermediate storage or even further chemical transformation or purification takes place after hydrogenation of the feed wax and before de-oiling of the hydrogenated wax.

BRIEF DESCRIPTION OF THE FIGURE

The figure depicts a crystalliser useful in de-oilling unhydrogenated wax.

The hydrogenated wax may be de-oiled to reduce the oils content of the hydrogenated wax to less than 0.5 weight % MEK-solubility, preferably to less than 0.4 weight % MEK-solubility, more preferably to less than 0.3 weight % MEK-solubility, most preferably to less than 0.2 weight % MEK-solubility. The MEK-solubility is determined using the testing procedure specified in ASTM D721.

The feed wax may include at least about 0.5 weight % aliphatic olefins.

The feed wax may include at least about 0.1 weight % oxygenated hydrocarbons, optionally at least about 0.5 weight % oxygenated hydrocarbons.

Typically, the feed wax includes less than about 10 weight % aliphatic olefins.

Typically, the feed wax includes less than about 5 weight % oxygenated hydrocarbons.

The feed wax may include between about 0.5 and about 10 weight %, typically between about 0.5 and about 2 weight % α-olefins.

The feed wax may include between about 0.5 and about 10 weight %, typically between about 0.5 and about 5 weight % internal olefins.

The feed wax may include between about 0.01 and about 5 weight %, typically between about 0.1 and about 0.6 weight % 1-alcohols.

The feed wax may include between about 0.01 and about 5 weight %, typically between about 0.1 and about 1 weight % esters.

The feed wax may include between about 0.01 and about 5 weight %, typically between about 0.1 and about 1 weight % ketones.

The feed wax may include between 0.01 and 1 weight %, typically between 0.05 and 0.5 weight % aldehydes.

It has now surprisingly been found that at least certain waxes are beneficially produced by a reverse sequence in which the feed wax is first hydrogenated, followed by de-oiling thereof. Although not wishing to be bound by theory, it is believed that certain waxes contain particular molecule species, e.g. oxygenates, in concentrations which are extremely difficult to de-oil. If however the wax is first hydrogenated these molecule species are converted to hydrocarbons which are readily removed by de-oiling. Slack wax produced as by-product from crude oil refineries does for instance contain very little, if any, oxygenates.

The feed wax may be a paraffinic wax.

Typically, the feed wax includes more than 80 weight % paraffins.

At least 85% by weight of the paraffins in the feed wax may be n-paraffins, as opposed to iso-paraffins.

Typically, during de-oiling of the hydrogenated wax, the ratio of n-paraffin to iso-paraffin is increased due at least in part to the removal of iso-paraffins. The average chain length may be increased due to the preferred removal of light n-alkanes.

In one embodiment of the invention, the feed wax has the following composition, with the components adding up to 100 weight % or, if not adding up to 100%, the balance then being made up by at least one other wax component:
n-paraffin—between 85 and 95 weight %
branched paraffin—between 1 and 10 weight %
α-olefins—between 0.5 and 10 weight %
internal olefins—between 0.5 and 10 weight %
branched olefins—between 0.001 and 1 weight %
1-alcohols—between 0.01 and 5 weight %
esters—between 0.01 and 5 weight %
ketones—between 0.01 and 5 weight %
aldehydes—between 0.01 and 1 weight %.

The feed wax may be a Fischer-Tropsch-derived wax, i.e. a wax produced by the Fischer-Tropsch process.

In one embodiment of the invention, the feed wax is a Fischer-Tropsch cobalt-derived wax, i.e. a wax produced by a Fischer-Tropsch process employing a cobalt-based Fischer-Tropsch catalyst.

The feed wax may be a low-temperature Fischer-Tropsch (LTFT) cobalt-derived wax. In particular, the feed wax may be wax produced by a gas-to-liquids low-temperature Fischer-Tropsch process employing a cobalt-based catalyst.

De-oiling the hydrogenated wax may include subjecting the hydrogenated wax to a fractional crystallisation de-oiling process. Fractional crystallisation to separate oils from waxes is disclosed, for example, in U.S. Pat. No. 6,074,548.

The method may include processing the hydrogenated wax at a temperature of less than 80° C., preferably less than 70° C. during the fractional crystallisation de-oiling process.

Typically, de-oiling the hydrogenated wax includes subjecting the hydrogenated wax to a fractional crystallisation de-oiling process, the hydrogenated wax being processed at a temperature of less than 80° C. during the fractional crystallisation de-oiling process and no more than five cycles or stages, each including at least four phases with different temperature profiles, being employed in the fractional crystallisation de-oiling process.

The method may include separating wax with a broad range of chain lengths into two or more wax fractions each with a narrower range of chain lengths, and using at least one of such wax fractions as the feed wax.

The method may include removing aluminium contaminants from the feed wax prior to hydrogenating the feed wax. The removal of aluminium contaminants from the product of a Fischer-Tropsch synthesis reaction is, for example, described in U.S. Pat. No. 7,416,656.

Hydrogenating the feed wax may be effected catalytically using any suitable technique known to persons skilled in the art of wax hydrogenation. Typically, the feed wax is hydrogenated using hydrogen at an elevated pressure between about 30 and about 70 bar(a), e.g. about 50 bar(a) and an elevated temperature between about 150 and about 250° C., e.g. about 220° C. in the presence of a hydrogenation catalyst, such as NiSat 310 available from Süd-Chemie SA (Pty) Ltd of 1 Horn Street, Chloorkop, 1624, South Africa.

The feed wax may be partially hydrogenated to saturate all olefins, leaving the oxygenated hydrocarbons in the hydrogenated wax. Preferably however, the feed wax is fully hydrogenated so that all oxygenated hydrocarbons in the feed wax are completely transformed to hydrocarbons and all olefins are saturated.

The method may include adding an antioxidant to the hydrogenated wax and/or to the wax product. In one embodiment of the invention, the antioxidant is butylated hydroxytoluene.

The method may include subjecting the wax product to a polishing hydrogenation step or process. In particular, if the feed wax is only partially hydrogenated to saturate the olefins and leaving the oxygenated hydrocarbons unsaturated, the method may require a polishing hydrogenation step.

The invention extends to a wax product produced by the method as hereinbefore described.

The wax product may have an average congealing point between 45° C. and 69° C. when determined using the testing procedure specified in ASTM D938 and a needle penetration at 25° C. (0.1 mm) of less than 18, or less than 16, when determined using the testing procedure specified in ASTM D1321.

In one embodiment of the invention, the wax product has an average congealing point between 50° C. and 59° C., when determined using the testing procedure specified in ASTM D938.

In another embodiment of the invention, the wax product has an average congealing point between 60° C. and 69° C. when determined using the testing procedure specified in ASTM D938

The wax product preferably has a needle penetration at 25° C. (0.1 mm) of less than 18. The needle penetration is determined using the testing procedure specified in ASTM D1321.

When the wax product has an average congealing point between 60° C. and 69° C. when determined using the testing procedure specified in ASTM D938, the wax product preferably has a needle penetration at 25° C. (0.1 mm) of less than 16, when determined using the testing procedure specified in ASTM D1321.

The wax product preferably has a Saybolt colour of at least +30. The Saybolt colour is determined using the testing procedure specified in ASTM D156.

The invention will now be described by way of the following examples and the accompanying drawing which shows a three-dimensional view of a crystalliser.

EXAMPLE 1

A so-called FT50 paraffinic wax fraction (having a congealing point between 50° C. and 59° C. as determined by ASTM D938) produced by a low temperature Fischer-Tropsch gas-to-liquids facility employing a cobalt catalyst was fully hydrogenated in a fixed bed under the conditions set out in Table 1.

TABLE 1

Operating conditions for hydrogenation of FT50 wax fraction.

| Catalyst | NiSat 310 (Süd-Chemie) |
|---|---|
| P (bar) | 50 |
| $H_2$:Wax ratio ($l_N$/kg wax) | 333 |

TABLE 1-continued

Operating conditions for hydrogenation of FT50 wax fraction.

| | |
|---|---|
| LHSV ($h^{-1}$) | 0.5 |
| Temperature (° C.) | 220 |

Table 2 sets out the composition of the FT50 wax fraction prior to hydrogenation, and after hydrogenation.

TABLE 2

Analysis of the unhydrogenated and hydrogenated FT50 wax fractions used in subsequent de-oiling experiments

| | Unhydrogenated Wax | Hydrogenated Wax |
|---|---|---|
| n-Paraffins (wt %) | 88.53 | 93.44 |
| Branched Paraffins (wt %) | 6.56 | 6.56 |
| α-olefins (wt %) | 1.14 | |
| Internal olefins (wt %) | 2.52 | |
| Branched olefins (wt %) | 0.01 | |
| 1-Alcohols (wt %) | 0.25 | |
| Esters (wt %) | 0.47 | |
| Ketones (wt %) | 0.41 | |
| Aldehydes (wt %) | 0.13 | |
| Other Oxygenates (wt %) | 0 | |
| Total (wt %) | 100.00 | 100.00 | is slowly increased and the high oil content material simultaneously drips out of a solid paraffin wax that is formed. The paraffin wax is thus "sweated" in the third processing stage. In the last processing stage, the paraffin wax product is melted. The wax product from the crystalliser has a much lower oil content than the raw material fed to the crystalliser.

The temperature profile set across the four different phases depends heavily on the wax feed's melting point for each of the different fractionated wax cuts (e.g. FT50 or FT60). The temperature difference between phase 2 and 4 was at least 20° C. The de-oiling temperature at phase 2 was between 40-50° C. and at phase 4 between 60-70° C. The batch time to complete one cycle of all four phases of crystallisation was about 12-20 hours.

In order to increase the selectivity of the process it is often necessary to carry out several process stages or cycles. This improves yield and product quality. The wax fractions were passed through more crystalliser units, each of which represents one process stage or cycle. The product properties after completion of a number of stages or cycles are shown in Tables 3, 4 and 5.

The aim was to obtain a wax fraction with a product specification of a Saybolt colour of +30, an MEK-solubility of less than 0.1 weight % and a needle penetration (0.1 mm) @ 25° C. of less than 18.

Table 3 sets out the results of the de-oiling of the unhydrogenated FT50 wax fraction.

TABLE 3

Laboratory-scale experimental results for de-oiling of unhydrogenated FT50 wax fraction

| | Feed | Foots oil (residue wax) | Stage 1 | Stage 2 | Stage 3 Feed Stage | Stage 4 | Stage 5 | Stage 6 | Stage 7 |
|---|---|---|---|---|---|---|---|---|---|
| Colour (Saybolt) | 29 | | | | | | | | |
| Congealing point (° C.) | 54 | 38 | 50 | 54 | 56 | 57 | 58.8 | 59 | 59.5 |
| MEK-solubility (wt %) | 5.3 | 21 | 7.5 | 3.9 | 2.3 | 1.2 | 0.7 | 0.58 | 0.2 |
| Needle Penetration (0.1 mm) @ 25° C. | 27 | | 58 | 23 | 16 | 11 | 9 | 7 | 6 |
| Needle Penetration (0.1 mm) @ 40° C. | | | | | 129 | 58 | 32 | 20 | 16 |

De-Oiling of Unhydrogenated Wax

The unhydrogenated FT50 wax fraction was de-oiled using a fractional crystallisation de-oiling process on a laboratory scale (6 liters). Prior to de-oiling, butylated hydroxytoluene was added as an antioxidant.

The de-oiling process was conducted in a crystalliser as shown in the single accompanying drawing. Essentially the crystalliser comprises a steel box with a number of vertical cooling/heating plates with large heat transfer surfaces. These plates are cooled or heated by hot or cold water. Raw material to be crystallised is introduced from the top in a batch wise process under atmospheric pressure. The oils components (also referred to as foots oil), and de-oiled wax final products produced are drained off at the bottom.

The crystallisation process takes place in four distinct processing phases. The first processing phase is cooling/crystallisation during which nucleation of some crystals takes place on cold surfaces of the crystalliser. In the second processing phase the temperature is further decreased and the crystals grow together to form a solid body between the cooling plates. At the bottom of the crystalliser a remaining liquid part of the raw material is drained off by opening a bottom valve. In the third processing phase the temperature Table 4 sets out the results of HTGCxGC analysis of the feed, foots oil (residue wax) and final de-oiled product of the unhydrogenated FT50 wax fraction after 7 crystallisation stages.

TABLE 4

Results of HTGCxGC analysis of the feed, foots oil and final product of the unhydrogenated FT50 de-oiling

| | Feed | Foots oil (Stage 1) | Product (Stage 7) |
|---|---|---|---|
| n-Paraffin's (wt %) | 88.53 | 47.86 | 97.19 |
| Branched Paraffin's (wt %) | 6.56 | 39.34 | 0.26 |
| α-olefins (wt %) | 1.14 | 1.76 | 0.84 |
| Internal olefins (wt %) | 2.52 | 3.59 | 1.33 |
| Branched olefins (wt %) | 0.01 | 0.80 | 0 |
| 1-Alcohols (wt %) | 0.25 | 2.62 | 0 |
| Esters (wt %) | 0.47 | 2.14 | 0.11 |

TABLE 4-continued

Results of HTGCxGC analysis of the feed, foots oil and
final product of the unhydrogenated FT50 de-oiling

|  | Feed | Foots oil (Stage 1) | Product (Stage 7) |
|---|---|---|---|
| Ketones (wt %) | 0.41 | 0.89 | 0.20 |
| Aldehydes (wt %) | 0.13 | 0.89 | 0.08 |
| Other Oxygenates (wt %) | 0 | 0.11 | 0 |
| Total (wt %) | 100.00 | 100.00 | 100.00 |

The final product yield was of the order of 75-80 weight % after a 7 stage or 7-cycle de-oiling process, in other words the product stream is approximately four times larger than a foots oil stream.

When this is taken into account, and considering the information in Table 4, it becomes quite clear that during the fractional crystallization de-oiling of unhydrogenated FT50 wax not all species contributing to oils content are removed in the initial stages of de-oiling, resulting in a need for many de-oiling stages in order to achieve product specifications. Since it is known that hydrogenation does not reduce oil content, it is not necessary to hydrogenate the product of each de-oiling stage, to determine whether the oil specification was achieved or not.

The applicant has found that particular species such as aliphatic olefins, alcohols, esters, ketones and aldehydes appear in the final product even after 6 or 7 stages of de-oiling. Without wishing to be bound by theory, the applicant believes that these components may contribute to oils content. For example, any degree of branching in these components will result in an iso-paraffin being formed after hydrogenation which will affect the MEK-solubility and needle penetration.

While the processing sequence (de-oiling, followed by hydrogenation) does eventually produce a final wax product that meets all of the required specifications, increasing the number of de-oiling stages from say 3 to say 7 for an FT50 wax fraction is expected to result in more than a doubling of the capital required for the construction of a commercial de-oiling unit.

De-Oiling of Hydrogenated Wax

The hydrogenated FT50 wax fraction was also de-oiled using the same fractional crystallisation de-oiling process on a laboratory scale. Prior to de-oiling, butylated hydroxytoluene was added as an antioxidant. The aim was to obtain a wax fraction with a product specification of a Saybolt colour of +30, an MEK-solubility of less than 0.5 weight % and a needle penetration (0.1 mm) @ 25° C. of less than 18. The results for the hydrogenated FT50 wax fraction are set out in Table 5.

TABLE 5

Laboratory-scale experimental results for
de-oiling of hydrogenated FT50 wax fraction

|  | Feed | Foots oil | Stage 1 | Stage 2 Feed Stage | Stage 3 | Stage 4 |
|---|---|---|---|---|---|---|
| Colour | 30 | 30 | 30 | 30 | 30 | 30 |
| CP (° C.) | 54.5 | 41.5 | 54 | 56.5 | 58 | 59 |
| MEK-solubility (wt %) | 3.18 3.3 | 14.23 13.1 | 1.37 | 1.04 | 0.23 0.27 | <0.1 |
| Needle Penetration (0.1 mm) @ 25° C. | 36 |  | 25 | 20 | 14 | 11 |
| Needle Penetration (0.1 mm) @ 40° C. |  |  |  |  | 49 | 21 |

As can be seen from the results above, the desired product specifications in this specific example could be met within 3 stages or cycles (each of four phases) for the hydrogenated FT50 wax fraction whereas the desired product specifications could only be met after 7 stages when the unhydrogenated FT50 wax fraction was used.

It is known that after hydrogenation of a de-oiled Fischer Tropsch wax fraction there is a slight softening of the wax (increase in needle penetration) and a slight increase in MEK-solubility. This would (but for the present invention) need to be addressed by setting a more stringent requirement for the de-oiling step so that after hydrogenation of the de-oiled wax, final product specifications are still met. For this reason the MEK-solubility requirement would otherwise need to be set more stringent, eg. at less than 0.1 weight %, for the de-oiled unhydrogenated Fischer Tropsch wax fraction, whereas the MEK-solubility requirement can be set less stringent, at less than 0.5 weight %, for a Fischer Tropsch wax fraction which was first hydrogenated and then de-oiled.

This example clearly shows the impact that hydrogenation of the wax feed before de-oiling can have on the fractional crystallization process and the efficiency of the process.

Similar results were obtained when a so-called FT60 wax fraction (with a congealing point between 60° C. and 69° C.) were used, although the un-hydrogenated FT60 wax fraction could be de-oiled to less than 0.1 weight % MEK-solubility with 6 stages, and not 7 or 8 as was the case for the un-hydrogenated FT50 wax fraction.

EXAMPLE 2

Solvent De-Oiling Followed by Hydrogenation

A wax produced by an iron (Fe) catalysed Fischer Tropsch process was distilled to remove a light fraction, a heavy wax fraction and an intermediate fraction boiling between 350 and 500° C., to provide a so-called FT Medium Wax. The congealing point of the FT Medium Wax was 58° C. 700 ton of this FT Medium Wax was de-oiled using a solvent de-oiling process. The FT Medium Wax was sprayed under a pressure of 3 bar into a 5 m tower in air atmosphere, to form a wax powder. The wax powder was then mixed with 1,2, Dichloroethane solvent in a mixer at a temperature of 18° C., at a wax to solvent ratio between 1:2 and 1:3, to extract the oil components (foots oil) into the solvent. The mixture of wax particles in solvent was fed at a rate of about 6-8 t/h to a filtration unit, in which the wax particles were filtered from the solvent and the wax filter cake was again mixed with 1,2, Dichloroethane solvent to extract residual oil components therefrom. The solvent was subsequently stripped independently from both product and foots oil fractions, by means of vacuum distillation. The run took four days at an extraction temperature of 18° C. and a throughput between 6-8 t/h. The compositions and characteristics of the wax and foots oil fractions are shown in Table 6.

TABLE 6

Compositions and properties of wax and foots oil

| Parameters | Unit | Raw FT Medium Wax | FT Medium Wax Foots Oil | De-oiled FT Medium Wax Product |
|---|---|---|---|---|
| Congealing point | ° C. | 56.5 | 43.5 | 60.5 |
| Oil content | % w/w | 3.65 | 16.77 | 0.55 |
| PenN 25° C. | 0.1 mm | 22 | 115 | 11 |
| PenN 40° C. | 0.1 mm | 97 | 781.7 | 38 |
| Density 70° C. | kg/m³ | 780.4 | 3.4 | 779.6 |
| Viscosity 100° C. | mm²/s | 3.9 | | 4.3 |
| Sulphur | ppm | 40 | 149 | 5.9 |
| Colour ASTM | — | 0.5 | 0.8 | 1.5 |
| n-content | % | 75.4 | 52.3 | 84.8 |
| i-content | % | 24.6 | 47.7 | 15.2 |
| DO-Temperature | ° C. | — | 18 | 18 |
| yield | % | — | 33 | 67 |
| Throughput Feed | t/h | — | — | 6-8 |

The de-oiled FT Medium Wax product (after solvent de-oiling) was hydrogenated using a Kata Leuna KL8231 catalyst (Ni/Cr on Alumina support), under the following conditions: T=300° C., p=150 bar, LHSV=1.0$^{-1}$. Table 7 shows the composition of the hydrogenated FT Medium Wax.

TABLE 7

Composition and properties of hydrogenated FT Medium Wax

| Parameters | Unit | Hydrogenated FT Meduim Wax |
|---|---|---|
| Congealing point | ° C. | 60.5 |
| Oil content | % w/w | 0.63 |
| PenN 25° C. | 0.1 mm | 13 |
| PenN 40° C. | 0.1 mm | 51 |
| Density 70° C. | kg/m³ | 777.9 |
| Viscosity 100° C. | mm²/s | 4.3 |
| Sulphur | ppm | <0.1 |
| Odour | — | 0 |
| Colour Saybolt | — | 30 |
| n-content | % | 92.3 |
| i-content | % | 7.7 |
| Temperature | ° C. | 280 |
| Throughput | t/h | 28 |

Colour and sulphur data were in specification. The oil content and needle penetration data rose slightly after hydrogenation. The n-alkanes content increased due to the transformation of linear olefins and oxidized components to n-alkanes.

Hydrogenation Followed by Solvent De-Oiling

A 40 ton batch of FT Medium Wax was hydrogenated using the Kata Leuna KL8231 hydrogenation catalyst under the following conditions: T=280° C., p=150 bar, LHSV=1.0$^{-1}$, throughput=4 t/h. The results are shown in Table 8.

TABLE 8

Compositions and properties of unhydrogenated FT Medium Wax and hydrogenated FT Medium Wax

| Parameters | Unit | Unhydrogenated FT Medium Wax | Hydrotreated FT Medium Wax |
|---|---|---|---|
| Congealing point | ° C. | 56.5 | 57.5 |
| Oil content | % w/w | 3.65 | 3.00 |
| PenN 25° C. | 0.1 mm | 22 | 26 |
| PenN 40° C. | 0.1 mm | 97 | 132 |
| Density 70° C. | kg/m³ | 780.4 | 773.9 |
| Viscosity 100° C. | mm²/s | 3.9 | 3.8 |
| Sulphur | ppm | 40 | 0.4 |
| Odour | — | — | 0 |
| Colour Saybolt | — | 0.5 (ASTM) | 30 |
| FT-Test | ng/ml | — | 265 |
| n-content | % | 75.4 | 91.0 |
| i-content | % | 24.6 | 9.0 |
| Temperature | ° C. | — | 280 |
| Throughput | t/h | — | 4.0 |

The hydrogenated FT Medium Wax was de-oiled by solvent de-oiling, following the procedure described above. Table 9 shows the resulting final products.

TABLE 9

Composition and properties of hydrogenated and de-oiled FT Medium Wax

| Parameters | Unit | Hydrogenated and de-oiled FT Medium Wax |
|---|---|---|
| Congealing point | ° C. | 63.0 |
| Oil content | % w/w | 0.1 |
| PenN 25° C. | 0.1 mm | 12 |
| PenN 40° C. | 0.1 mm | 39 |
| Density 70° C. | kg/m³ | 775 |
| Viscosity 100° C. | mm²/s | 4.1 |
| Sulphur | ppm | 1.8 |
| Colour Saybolt | — | 7 |
| n-content | % | 94.6 |
| i-content | % | 5.4 |
| Deoiling-temperature | ° C. | 20 |
| yield | % | 76.0 |

The colour of hydro treated and de-oiled FT Medium Wax deteriorated especially during bench scale solvent de-oiling (probably during distillation used to separate product from solvent). This could result in a need for an additional hydro treating step.

Advantageously, the method of the invention improves the efficiency of wax de-oiling and reduces complexity in terms of meeting final wax product specifications since no allowance needs to be made for wax softening or an increase in MEK-solubility during hydrogenation. The risk of decolourisation during or after de-oiling is low if all of the oxygenates and olefins are converted during hydrogenation, since no additional compounds are added during the fractional crystallization de-oiling process and the temperature of the wax is kept sufficiently low.

The invention claimed is:
1. A method of treating or refining a wax to produce a refined wax, the method comprising
   hydrogenating a Fischer-Tropsch-derived feed wax, thereby providing a hydrogenated wax;
   wherein the hydrogenated wax has an MEK soluble oils content of more than 0.5 weight %, and includes at least 0.1 weight % oxygenated hydrocarbons; and
   thereafter subjecting the hydrogenated wax to a fractional crystallization de-oiling process, thereby producing the refined wax;
   wherein the MEK soluble oils content of the refined wax is less than 0.5 weight %, and the refined wax has an average congealing point between 45° C. and 69° C. when determined using the testing procedure specified in ASTM D938.

2. The method of claim 1, wherein the feed wax includes at least 0.5weight % aliphatic olefins.

3. The method of claim 2, wherein the hydrogenated wax comprises no olefins.

4. The method of claim 1, wherein the feed wax is a wax produced by a Fischer-Tropsch process employing a cobalt-based Fischer-Tropsch catalyst.

5. The method of claim 1, wherein the hydrogenated wax is processed at a temperature of less than 80° C. during the fractional crystallization de-oiling process.

6. The method of claim 5, wherein the hydrogenated wax is processed at a temperature of less than 70° C. during the fractional crystallization de-oiling process.

7. The method of claim 1, wherein the feed wax has the following composition, with the components adding up to 100 weight % or, if not adding up to 100%, the balance then being made up by at least one other wax component:
- n-paraffin—between 85 and 95 weight %
- branched paraffin —between 1 and 10 weight %
- α-olefins—between 0.5 and 10 weight %
- internal olefins—between 0.5 and 10 weight %
- branched olefins—between 0.001 and 1 weight %
- 1-alcohols—between 0.01 and 5 weight %
- esters—between 0.01 and 5 weight %
- ketones—between 0.01 and 5 weight %
- aldehydes—between 0.01 and 1 weight %.

8. The method of claim 1, wherein at least 85% by weight of the paraffins in the feed wax are n-paraffins.

* * * * *